(12) United States Patent
Mantych et al.

(10) Patent No.: US 12,362,590 B2
(45) Date of Patent: Jul. 15, 2025

(54) CONTROLLING BULK CAPACITANCE CHARGE IN A POWER TOOL DEVICE

(71) Applicant: MILWAUKEE ELECTRIC TOOL CORPORATION, Brookfield, WI (US)

(72) Inventors: Nicholas C. Mantych, Burlington, WI (US); Alexander T. Huber, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 722 days.

(21) Appl. No.: 17/586,496

(22) Filed: Jan. 27, 2022

(65) Prior Publication Data

US 2022/0247202 A1 Aug. 4, 2022

Related U.S. Application Data

(60) Provisional application No. 63/143,473, filed on Jan. 29, 2021.

(51) Int. Cl.
*H02J 7/00* (2006.01)
*H02J 7/34* (2006.01)

(52) U.S. Cl.
CPC ............ *H02J 7/345* (2013.01); *H02J 7/0036* (2013.01); *H02J 7/0063* (2013.01);
(Continued)

(58) Field of Classification Search
CPC .. H02J 50/12; H02J 50/90; H02J 50/70; H02J 50/80; H02J 50/60; H02J 50/50;
(Continued)

(56) References Cited

U.S. PATENT DOCUMENTS

2011/0006726 A1 1/2011 Dittmer et al.
2013/0200851 A1* 8/2013 Bieler .................. H02J 7/0013
320/126
(Continued)

FOREIGN PATENT DOCUMENTS

EP         2556982 A1   2/2013
EP         3745555 A1  12/2020
KR    1020190092089 A   8/2019

OTHER PUBLICATIONS

International Search Report and Written Opinion for Application No. PCT/US2022/014105 dated May 12, 2022 (10 pages).

*Primary Examiner* — Binh C Tat
(74) *Attorney, Agent, or Firm* — Michael Best & Friedrich LLP

(57) ABSTRACT

A power tool device including a housing, first and second battery pack terminals, at least one bulk capacitor, a pre-charge circuit, and a discharge circuit. The pre-charge circuit includes at least one resistance connected in series with the at least one bulk capacitor, and a pre-charge switch connected in series with the at least one resistance. The pre-charge switch is configured to selectively provide a conductive path to charge the at least one bulk capacitor. The discharge circuit includes a first switch and a second switch connected in series with the at least one bulk capacitor. The first switch and the second switch are configured to be turned on after the at least one bulk capacitor is charged to a DC bus voltage.

20 Claims, 16 Drawing Sheets

(52) U.S. Cl.
CPC ....... *H02J 7/00714* (2020.01); *H02J 2207/20* (2020.01); *H02J 2207/50* (2020.01)

(58) Field of Classification Search
CPC ...... H02J 7/35; H02J 7/00304; H02J 7/00034; H02J 7/0047; H02J 50/005; H02J 50/402; H02J 50/20; H02J 7/00; H02J 2310/40; H02J 7/007182; H02J 7/04; H02J 2300/28; H02J 7/00045; H02J 7/34; H02J 50/05; H02J 7/00309; H02J 2310/48; H02J 50/502; H02J 50/10; H02J 50/40; H02J 50/30; H02J 7/0029; H02J 50/15; H02J 7/0048; H02J 7/00714; H02J 2207/40; H02J 3/322; H02J 7/345; H02J 7/0042; H02J 7/0044; H02J 7/02; H02J 2207/20; H02J 2207/50; H02J 2300/24; H02J 2310/23; H02J 50/23; H02J 7/0036; H02J 7/0063; H02J 7/00712; H03H 2001/0057; H03H 1/00; B60L 2210/10; B60L 53/122; B60L 53/12; B60L 1/006; B60L 2240/527; B60L 2240/529; B60L 53/55; B60L 53/64
USPC .................................................. 320/161–167
See application file for complete search history.

(56) References Cited

U.S. PATENT DOCUMENTS

| | | | |
|---|---|---|---|
| 2019/0207269 A1* | 7/2019 | Junger | H01M 10/4207 |
| 2020/0223314 A1 | 7/2020 | Curuvija et al. | |
| 2020/0298722 A1* | 9/2020 | Smolenaers | H02J 7/345 |

* cited by examiner

CONTROLLING BULK CAPACITANCE CHARGE IN A POWER TOOL DEVICE

RELATED APPLICATIONS

This application claims the benefit of U.S. Provisional Patent Application No. 63/143,473, filed Jan. 29, 2021, the entire content of which is hereby incorporated by reference.

FIELD

Embodiments described herein provide battery pack powered power tool devices.

SUMMARY

Embodiments described herein provide systems and methods for charging bulk capacitors with a controlled current, which enables the use of lower-rated, smaller electrical components (e.g., switches). The systems and methods include controlling the charge stored in the bulk capacitors connected to a power bus of a power tool device (e.g., connected to a motor inverter). By controlling the charging of the bulk capacitors, a peak in-rush current during start up can be limited. Additionally, the bulk capacitors can be disconnected from the battery pack terminals of a power tool device to allow for quick discharge of any parasitic voltage on the battery pack terminals (which could possibly come into contact with a user) when the power tool device is idle or otherwise not in use.

Power tool devices described herein include a housing, first and second battery pack terminals, at least one bulk capacitor, a pre-charge circuit, and a discharge circuit. The pre-charge circuit includes at least one resistance connected in series with the at least one bulk capacitor, and a pre-charge switch connected in series with the at least one resistance. The pre-charge switch is configured to selectively provide a conductive path to charge the at least one bulk capacitor. The discharge circuit includes a first switch and a second switch connected in series with the at least one bulk capacitor. The first switch and the second switch are configured to be turned on after the at least one bulk capacitor is charged to a DC bus voltage.

In some aspects, the power tool devices further include a charge pump circuit.

In some aspects, the charge pump circuit is a DC-to-DC converter.

In some aspects, the charge pump circuit is configured to receive an input from a controller for controlling a discharge gate driver.

In some aspects, the power tool devices further include a discharge gate driver.

In some aspects, the charge pump circuit provides an output charge pump signal to the discharge gate driver for driving the first switch and the second switch.

In some aspects, the pre-charge circuit is configured to be turned on when the power tool device is powered on.

In some aspects, the pre-charge switch, the first switch, and the second switch are configured to be turned off when the power tool device is powered off.

In some aspects, the pre-charge circuit is connected in parallel with the discharge circuit.

In some aspects, the at least one bulk capacitor includes a plurality of bulk capacitors.

Methods described herein for controlling a power tool device include activating a pre-charge circuit, activating a discharge circuit, and deactivating the pre-charge circuit and the discharge circuit. Activating the pre-charge circuit includes charging at least one bulk capacitor, and limiting a charge current to the at least one bulk capacitor using a first resistance connected in series with the at least one bulk capacitor. Activating the discharge circuit includes enabling a full charge capacity of the at least one bulk capacitor, and reducing a resistance in series with the at least one bulk capacitor; and In some aspects, the methods further include receiving, at a charge pump circuit, an input from a controller for controlling a discharge gate driver.

In some aspects, the methods further include providing, via the charge pump circuit, an output charge pump signal to the discharge gate driver to drive a plurality of switches.

In some aspects, the at least one bulk capacitor includes a plurality of bulk capacitors.

In some aspects, the plurality of bulk capacitors are connected in parallel.

In some aspects, the methods further include activating the pre-charge circuit when the power tool device is turned on.

In some aspects, the methods further include deactivating a pre-charge switch, a first switch of the discharge circuit, and a second switch of the discharge circuit when the power tool device is turned off.

In some aspects, the methods further include connecting the pre-charge circuit in parallel with the discharge circuit.

In some aspects, the methods further include isolating the at least one bulk capacitor from exposed terminal contacts.

Power tools described herein include a housing, first and second battery pack terminals, a plurality of bulk capacitors, a pre-charge circuit, and a discharge circuit. The pre-charge circuit includes at least one resistance connected in series with the plurality of bulk capacitors, and a pre-charge switch connected in series with the at least one resistance. The pre-charge switch is configured to selectively provide a conductive path to charge the plurality of bulk capacitors. The discharge circuit includes a first switch and a second switch connected in series with the plurality of bulk capacitors. The first switch and the second switch are configured to be turned on after the plurality of bulk capacitors are charged to a DC bus voltage.

In some aspects, the power tools further include a charge pump circuit.

In some aspects, the charge pump circuit is a DC-to-DC converter.

In some aspects, the charge pump circuit is configured to receive an input from a controller for controlling a discharge gate driver.

In some aspects, the power tools further include a discharge gate driver.

In some aspects, the charge pump circuit provides an output charge pump signal to the discharge gate driver for driving the first switch and the second switch.

In some aspects, the pre-charge circuit is turned on when the power tool is powered on.

In some aspects, the pre-charge switch, the first switch, and the second switch are turned off when the power tool is powered off.

In some aspects, the pre-charge circuit is connected in parallel with the discharge circuit.

In some aspects, the plurality of bulk capacitors are connected in parallel.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 200%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
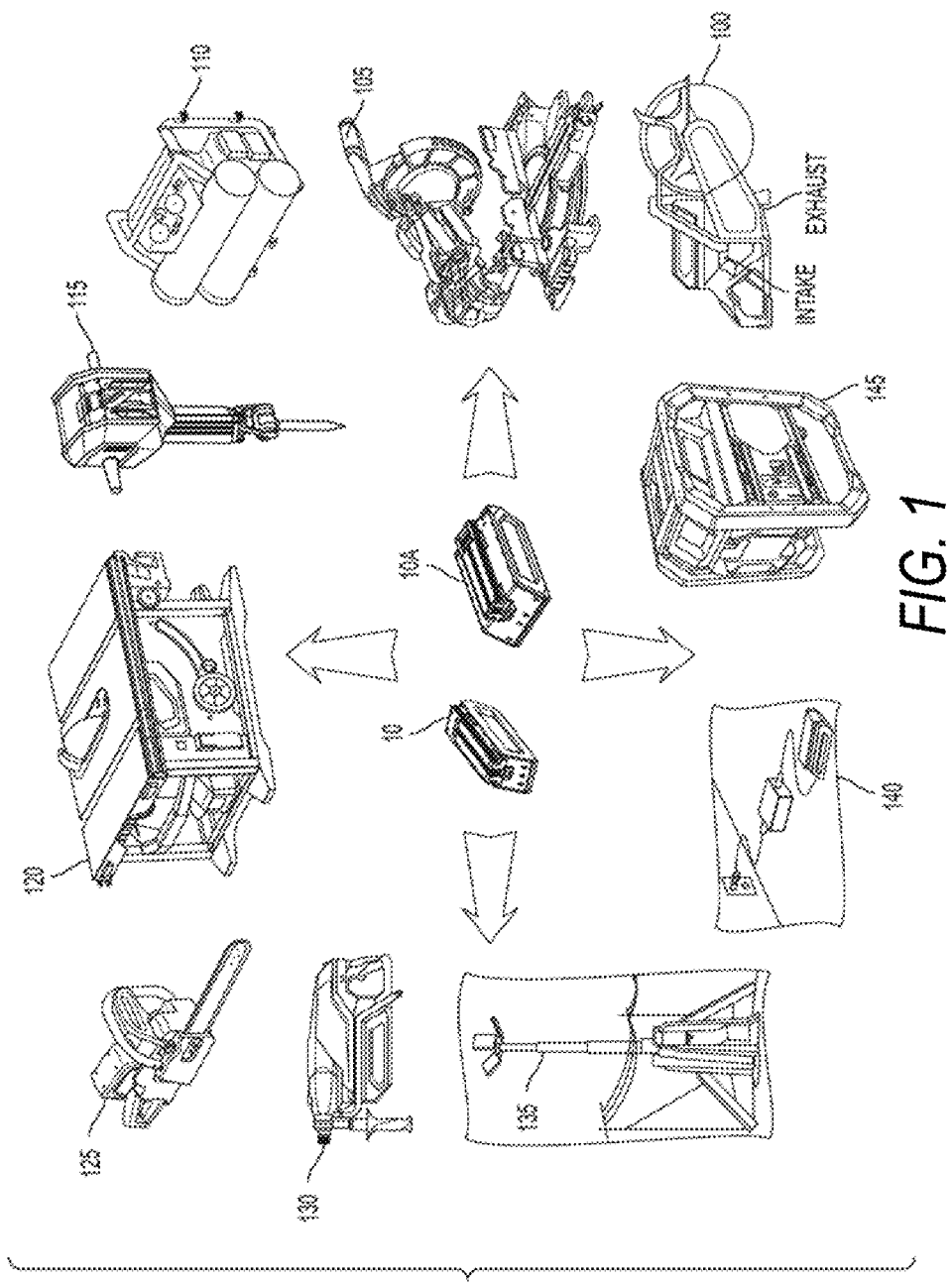
FIG. 1 illustrates battery packs within a system of power tool devices.

FIG. 1 illustrates a high-power electrical system to which a capacitance control system may be found. The high-power electrical system includes various high-power electrical devices enabled to use the capacitance control system. For example, the high-power electrical system includes hand-held devices (i.e., devices configured to be supported by an operator during use) and non-hand-held devices (i.e., devices supported on a work surface or support rather than by the operator during use). Such devices include motorized power tools (e.g., a drill, an impact driver, an impact wrench, a rotary hammer, a hammer drill, a saw [a circular saw, a cut-off saw 100, a reciprocating saw, a miter saw 105, a table saw 120, etc.], a core drill 130, a breaker 115, a demolition hammer a compressor 110, a pump, etc.), outdoor tools (e.g., a chain saw 125, a string hammer, a hedge trimmer, a blower, a lawn mower, etc.), drain cleaning and plumbing tools, construction tools, concrete tools, other motorized devices (e.g., vehicles, utility carts, wheeled and/or self-propelled tools, etc.), etc. and non-motorized electrical devices (e.g., a power supply 145, a light 135, an AC/DC adapter 140, a generator, etc.).

Figure 2:
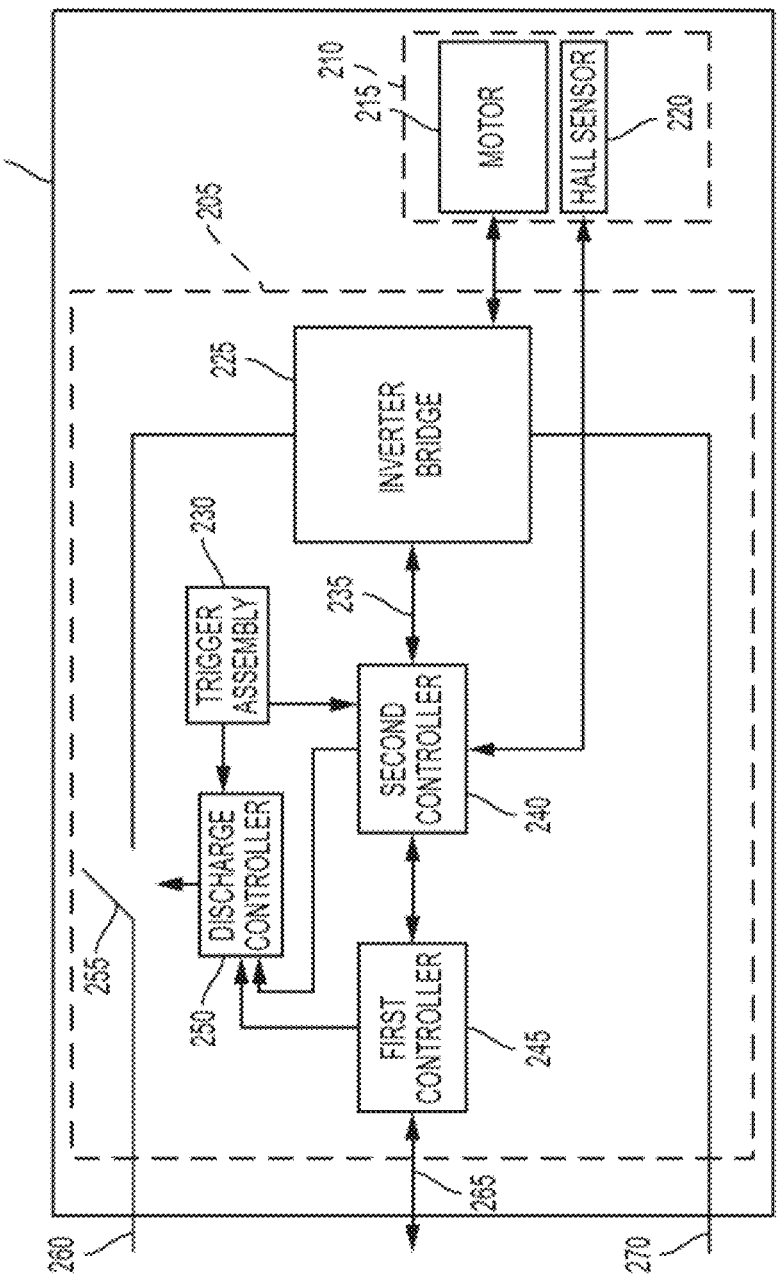
FIG. 2 illustrates a simplified block diagram of a power tool device.

FIG. 2 illustrates a simplified block diagram of an embodiment illustrating an electronics assembly 275 and a motor assembly 210 of a power tool or power tool device 200. The electronics assembly 275 includes a positive power input terminal 260, a negative power input terminal 270, a first controller 245, a second controller 240, an inverter bridge 225, and a trigger assembly 230. The motor assembly 210 includes a motor 215 and a rotor position sensor assembly 220. The electronics assembly 275 may also include additional user inputs, for example, a mode selector switch, a speed dial, a clutch setting unit, etc. In some embodiments, the electronics assembly 275 may include a power switch in addition to or in place of the trigger assembly 230.

The functionality of the implemented circuit may be divided between the first controller 245 and the second controller 240. For example, the first controller 245 may be a main controller of the system, whereas the second controller 240 is an application controller controlling one or more applications of the implemented circuit. In some embodiments, the second controller 240 may be a motor controller controlling operation of the inverter bridge 225 and the motor 215, and the first controller 245 may be a main controller that performs other functionality of the implemented circuit. By distributing the functional load of the high-capacity and high-powered implemented circuit, and by particularly separating motor control functionality from a first controller 245, thermal load is distributed among the first controller 245 and the second controller 240. This thermal distribution thereby reduces the thermal signature of the implemented circuit.

In some embodiments, the first controller 245 and/or the second controller 240 are implemented as microprocessors with separate memory. In other embodiments, the first controller 245 and/or the second controller 240 may be implemented as microcontrollers (with memory on the same chip). In other embodiments, the first controller 245 and/or the second controller 240 may be implemented partially or entirely as, for example, field programmable gate arrays (FPGA), application specific integrated circuits (ASIC), hardware implemented state machines, etc., and the memory may not be needed or modified accordingly.

In some embodiments, the second controller 240 and the motor assembly 210 may be part of a single motor package. This motor package offers modularity for future applications. For example, multiple motor packages, each including a motor assembly 210 and a second controller 240, may be assembled in the implemented circuit and controlled by a single first controller 245.

A communication protocol may be implemented between the first controller 245 and the second controller 240 in order to maintain an uninterrupted operation of the implemented circuit. In one example, the first controller 245 and the second controller 240 may communicate over a communication bus 235 such as a serial peripheral interface (SPI) bus. The first controller 245 and the second controller 240 may be configured such that the first controller 245 and the second controller 240 exchange communications at a certain time interval. The time interval may be, for example, between 3 milliseconds (ms) to 15 ms. The first controller 245 may also communicate with a battery pack controller over a communication link 265.

As described above, in some embodiments, the second controller 240 controls the operation of motor 215 through the inverter bridge 225. The first controller 245 is communicatively coupled to the trigger assembly 230. The trigger assembly 230 may include, for example, a potentiometer, a distance sensor, etc., to determine and provide an indication of the distance the trigger is pulled to the first controller 245. The first controller 245 reads and processes the trigger information and provides the trigger information to the second controller 240. The second controller 240 is communicatively coupled to the rotor position sensor assembly 220. As described above, the rotor position sensor assembly 220 provides an absolute rotational position of the rotor and/or the rotational speed of the rotor. The second controller 240 performs an open loop or closed loop control of the motor 215 through the inverter bridge 225 based on the signals received from the first controller 245 (e.g., trigger information) and the rotor position sensor assembly 220. In some embodiments, the first controller 245 and the second controller 240 are communicatively coupled to the rotor position sensor assembly 220 to provide redundancy for monitoring rotation speed.

Figure 3:
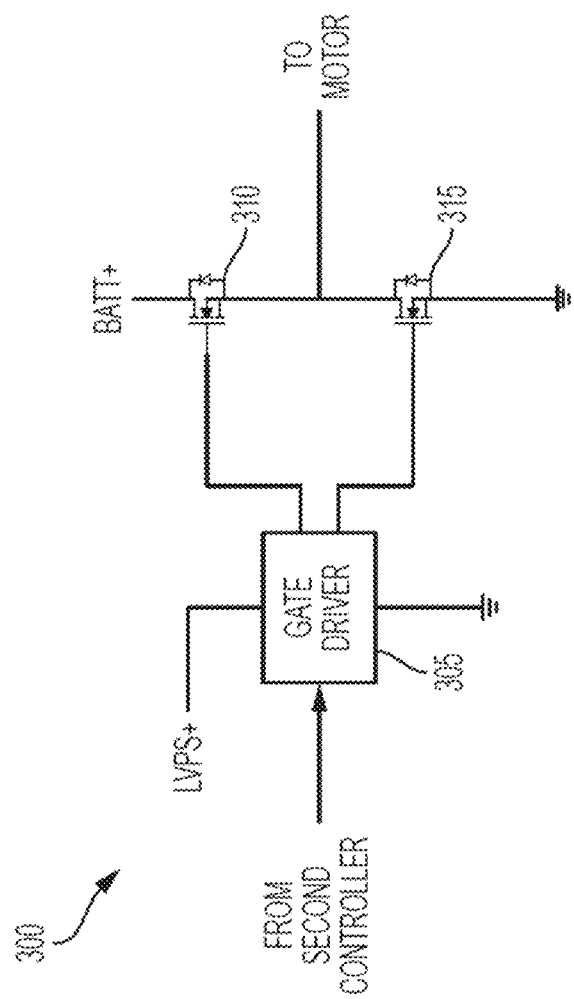
FIG. 3 illustrates an embodiment of an inverter bridge that controls a power tool device.

FIG. 3 illustrates an embodiment 300 of the inverter bridge 225 that controls the power supply to the three-phase (e.g., U, V, and W) motor 215 of the power tool device 200. The inverter bridge 300 includes gate drivers 305, high-side FETs 310, and low-side FETs 315 for each phase of the motor 215. The high-side FETs 310 and the low-side FETs 315 are controlled by the corresponding gate drivers 305.

In some embodiments, the inverter bridge 300 may include more than one high-side FET 310 and more than one low-side FET 315 per phase in order to provide redundant current paths for each phase. Although FIG. 3 illustrates only one set of a gate driver 305, a high-side FET 310, and a low-side FET 315, the inverter bridge 300 includes three sets of gate drivers 305, high-side FETs 310, and low-side FETs 315, one for each phase of the motor 215.

The high-side FETs 310 receive battery power supply at the drain of the high-side FETs 310. The source of the high-side FETs 310 is connected to the motor 215 (e.g., phase coil of the motor 215) to provide battery power supply to the motor 215 when the high-side FETs 310 are closed. In other words, the high-side FETs 310 are connected between the battery power supply and the motor phase coil.

The drain of the low-side FETs 315 is connected to the motor 215 (e.g., phase coils of the motor 215) and the source of the low-side FETs 315 is connected to ground. In other words, the low-side FETs 315 are connected between the motor phase coil and ground. The low-side FETs 315 provide a current path between the motor phase coils and ground when closed.

When the FETs 310, 315 are closed (or ON), the FETs 310, 315 allow a current flow through the phase coils. In contrast, when the FETs 310, 315 are open (or OFF), the FETs 310, 315 prevent a current flow through the phase coil. The FETs 310, 315 are characterized by a relatively high drain-source breakdown voltage (e.g., between 120V to 220V), a relatively high continuous drain current (e.g., between 50 A to 90 A), a relatively high pulsed drain current (e.g., over 300 A), and a drain-source on-state resistance ($R_{DS(on)}$) of less than 15 mΩ.

In contrast, FETs used in existing power tool devices were not rated for such high voltage and current characteristics. Accordingly, existing power tool devices would not be capable of handling such high current and voltage characteristics.

The gate drivers 305 provide a gate voltage to the FETs 310, 315 to control the FETs 310, 315 to open or close. The gate drivers 305 receive an operating power supply (e.g., a low-voltage power supply) from the battery pack 10, 10A. The gate drivers 305 also receive control signals, one each for the high-side current path and the low-side current path, form the second controller 240. The gate drivers 305 provide a control gate voltage (e.g., from the low-voltage power supply) to the FETs 310, 315 based on the control signals received from the second controller 240.

In some embodiments, the second controller 240 and the gate drivers 305 may control only the low-side FETs 315 to operate the motor 215. In other embodiments, the second controller 240 and the gate drivers 305 may control only the high-side FETs 310 to operate the motor 215. In other embodiments, the second controller 240 and the gate drivers 305 alternate between controlling the high-side FETs 310 and the low-side FETs 315 to operate the motor 215 and to distribute the thermal load between the FETs 310, 315.

In some embodiments, the inverter bridge 300 may also include a current sensor provided in the current path to detect a current flowing to the motor 215. The output of the current sensor is provided to the second controller 240. The second controller 240 may control the motor 215 further based on the output of the current sensor.

With reference to FIG. 2, a discharge switch 255 is provided on a current path between the power terminals and the inverter bridge 300 of the implemented circuit. The discharge switch 255 may be implemented using, for example, a metal-oxide-semiconductor field effect transistor (MOSFET). When the discharge switch 255 is open, current flow is stopped between power terminals and the inverter bridge 300.

A discharge controller 250 controls the discharge switch 255 (that is, opens and closes the discharge switch 255). The discharge controller 250 may be a logic circuit, a hardware implemented state machine, an electronic processor, etc. The discharge controller 250 receives inputs from the first controller 245, the second controller 240, and the trigger and provides a control signal to the discharge switch 255. The discharge controller 250 may also provide a status indication to the first controller 245 indicating whether the discharge switch 255 is open or closed.

Several techniques may be contemplated to implement a discharge control scheme of the power tool device 200 using the discharge switch 255. In one example, the discharge controller 250 may be an AND gate that implements a logic system with inputs from the first controller 245, the second controller 240, and the trigger assembly 230. The discharge controller 250 may close the discharge switch 255 only when the trigger, the first controller 245, and the second controller 240 provide controls signals to close the discharge switch 255.

In some embodiments, it may be desirable to close the discharge switch 255 to operate the motor 34 when the trigger is operated and the first controller 245 and the second controller 240 are ready for the operation. In these embodiments, the discharge controller 250 may close the discharge switch 255 from the trigger, the first controller 245, and the second controller 240. Accordingly, when one of the first controller 245 and the second controller 240 generates an interrupt due to detecting a problem, or when the trigger is released, the discharge controller 250 opens the discharge switch 255 to prevent current flow to the inverter bridge 300. In some embodiments, when the first controller 245 or the second controller 240 detects an overvoltage condition, an overcurrent condition, an overheating condition, etc., the first controller 245 or the second controller 240 may generate or terminate a signal to the discharge controller 250 to open the discharge switch 255.

Figure 4:
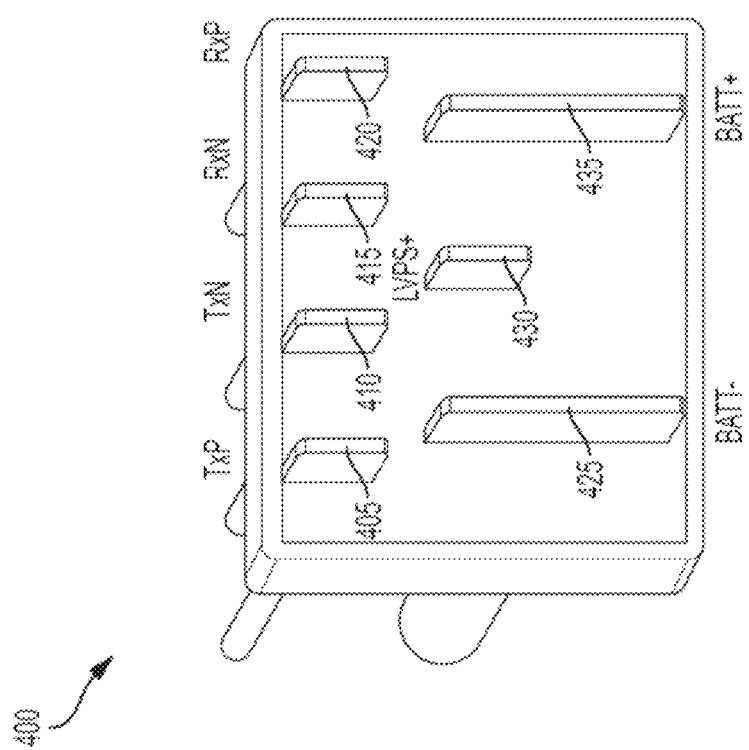
FIG. 4 illustrates a tool terminal block.

FIG. 4 illustrates a tool terminal block 400 including a positive power terminal 425, a ground terminal 435, a low-power terminal 430, a positive transmission terminal 405, a negative transmission terminal 410, a positive receiver terminal 420, and a negative receiver terminal 415. The positive power terminal 425 and the ground terminal 435 are connected to power terminals (i.e., a positive battery terminal and a ground terminal) of the battery pack 10, 10A to receive a main discharging current for the operation of the implemented circuit. The low-power terminal 430 receives a low-power voltage supply from a low-power terminal of the battery pack 10, 10A to power certain functions of the tool.

The positive transmission terminal 405, the negative transmission terminal 410, the positive receiver terminal 420, the negative receiver terminal 415 may together be referred to as "communication terminals" of the implemented circuit. The communication terminals allow for differential communication between the battery pack 10, 10A and the power tool device 200. In other embodiments, the tool communication terminals follow a full-duplex standard (for example, RS485 standard).

Referring back to FIG. 2, the positive power terminal 425 and the ground terminal 435 are electrically coupled to the inverter bridge 225 and provide a current path to operate the motor 215. The communication terminal (i.e., the positive transmission terminal 405, the negative transmission terminal 410, the positive receiver terminal 420, and the negative receiver terminal 415 may be coupled to first controller 245, for example, through a power tool device transceiver. The communication terminal provides the communication link 265 between the first controller 245 and a battery pack controller.

Figure 5A:
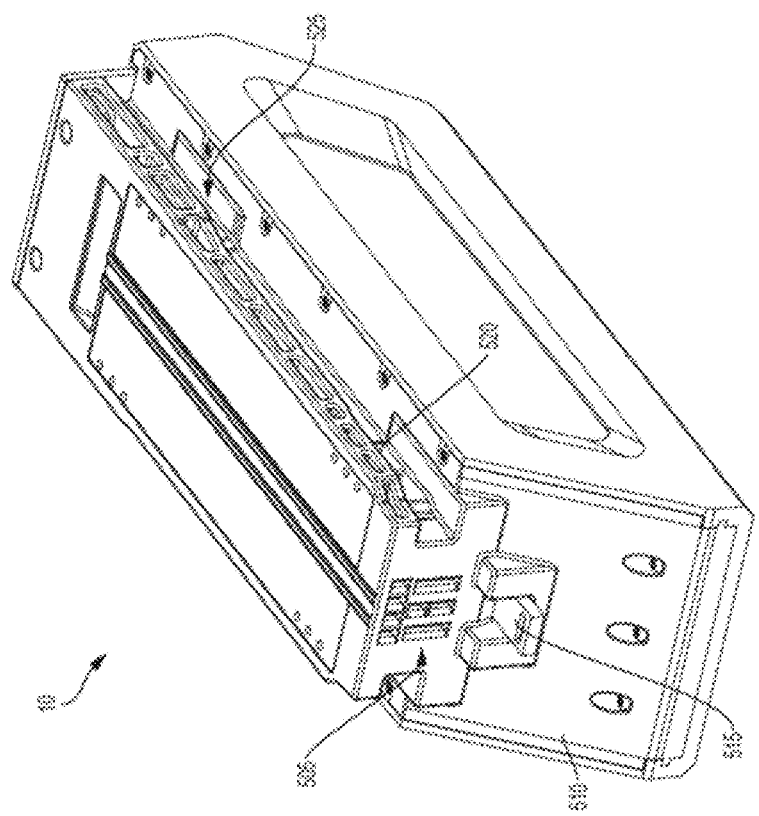
FIG. 5A and FIG. 5B illustrate different sized battery packs.
Figure 5B:
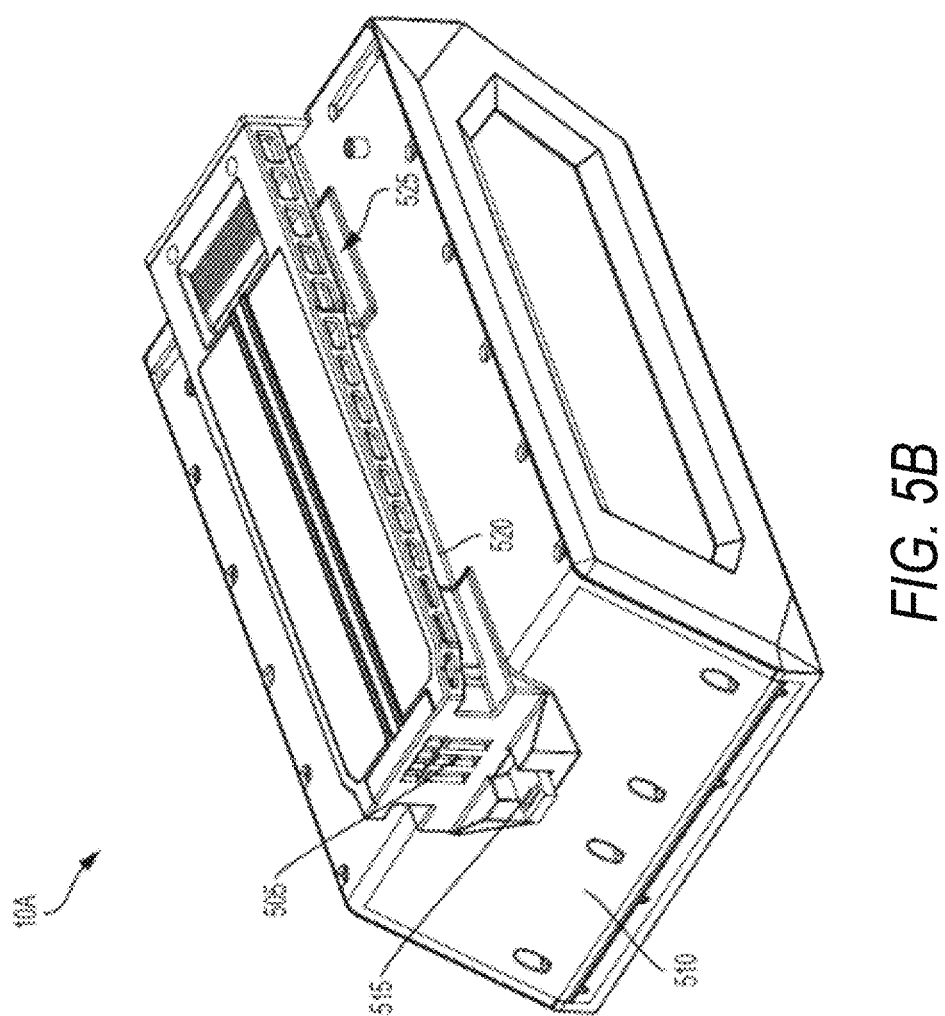

FIG. 5A and FIG. 5B illustrate embodiments of the battery packs 10, 10A. The battery pack 10 may include one or more cell strings, each having a number (e.g., 10) of battery cells connected in series to provide a desired discharge output (e.g., nominal voltage (e.g., 20 V, 40 V, 60 V, 80 V, 120 V) and current capacity). Accordingly, the battery pack 10, 10A may include "20S1P" (FIG. 5A), "20S2P" (FIG. 5B), etc., configurations. In other embodiments, other combinations of battery cells are also possible.

Each battery cell may have a nominal voltage between 3 V and 5 V and may have a nominal capacity between 3 Ah and 5 Ah. Each battery cell has a diameter of up to about 21 mm and a length of up to about 71 mm. The battery cells may be any rechargeable battery cell chemistry type, such as, for example, lithium (Li), lithium-ion (Li-ion), other lithium-based chemistry, nickel-cadmium (NiCd), nickel-metal hydride (NiMH), etc.

With reference to FIG. 5A, a battery pack 10 having a 20S1 configuration is illustrated in accordance with some embodiments. The battery pack 10 includes a battery pack housing 510 with a support portion 525 and a battery terminal block 505. The battery pack housing 510 encloses components of the battery pack 10 including the battery cells, a battery controller, etc. The support portion 525 provides a slide-on arrangement with a projection/recess 520 cooperating with a complementary projection/recess of the implemented circuit.

The battery pack 10 has an AC internal resistance (ACIR) within a range of approximately 150 mΩ to approximately 160 mΩ. The battery pack 10 has a DC internal resistance within a range of approximately 220 mΩ to approximately 260 mΩ.

With reference to FIG. 5B, a battery pack 10A having 20S2P configuration is illustrated in accordance with some embodiments. The battery pack 10A includes two cell strings of twenty series connected cells, the cell strings being connected in parallel. The battery pack 10A has an AC internal resistance (ACIR) within a range of approximately 75 mΩ to approximately 80 mΩ. The battery pack 10A has a DC internal resistance within a range of approximately 130 mΩ to approximately 170 mΩ.

The battery packs 10, 10A include a switch 515 extending from the housing 510. The switch is configured to be in a first position and a second position. When in the first (e.g., "OFF") position, electrical components (for example, the subcores) of the battery pack 10, 10A contained within the housing 510 are electrically disconnected from each other. When in the second (e.g., "ON") position, electrical components (for example, the subcores) are electrically connected to each other. The switch 515 may be manipulated by a user from the first position to a second position by pressing or sliding the switch 515.

Figure 6:
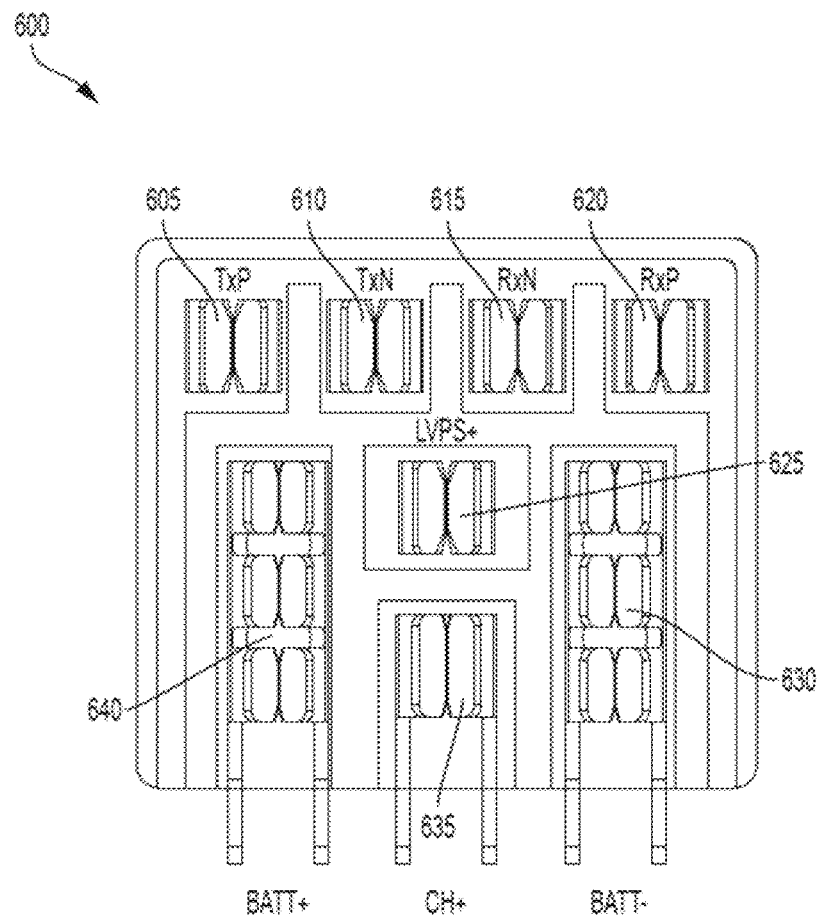
FIG. 6 illustrates a battery pack terminal block.

FIG. 6 illustrates the battery terminal block 600. The battery terminal block 600 is operable to electrically connect the battery pack 10, 10A and the power tool device 200 and, as illustrated, includes a positive battery terminal 640, a ground terminal 630, a charger terminal 635, a low-power terminal 625, a positive transmission terminal 605, a negative transmission terminal 610, a positive receiver terminal 620, and a negative receiver terminal 615. The positive battery terminal 640 and the ground terminal 630 are connectable to power terminals (i.e., positive power terminal 425 and ground terminal 435) of the power tool device 200. The charger terminal 635 and the ground terminal 630 are connected to charging terminals of a charger and receive charging current to charge the battery cells of the battery pack 10. In some embodiments, the battery pack terminals 630, 640 may be made of F-Tec material (a copper, phosphorus material) to offer battery thermal distribution capabilities and durability.

The ground terminal 630 may form a common reference between the battery pack 10, 10A and the power tool device 200. The low-power terminal 625 provides a low-power voltage supply to the power tool device 200 to power certain functions of the power tool device 200. For example, the low-power voltage supply may be used to power the first controller 245, the second controller 240, the gate drivers 305, indicators (e.g., LEDs), a communication module, etc. of the power tool device 200.

The positive transmission terminal 605, the negative transmission terminal 610, the positive receiver terminal 620, and the negative receiver terminal 615 may together be referred to as "battery communication terminals" of the battery pack 10, 10A. The battery communication terminals allow for differential communication between the battery pack 10 and the power tool device 200 or charger. The battery communication terminals and the communication terminals of the power tool device 200 together may be referred to as the communication link 265. In other embodiments, the communication terminals follow a full-duplex standard (for example, RS485 standard).

Figure 7:
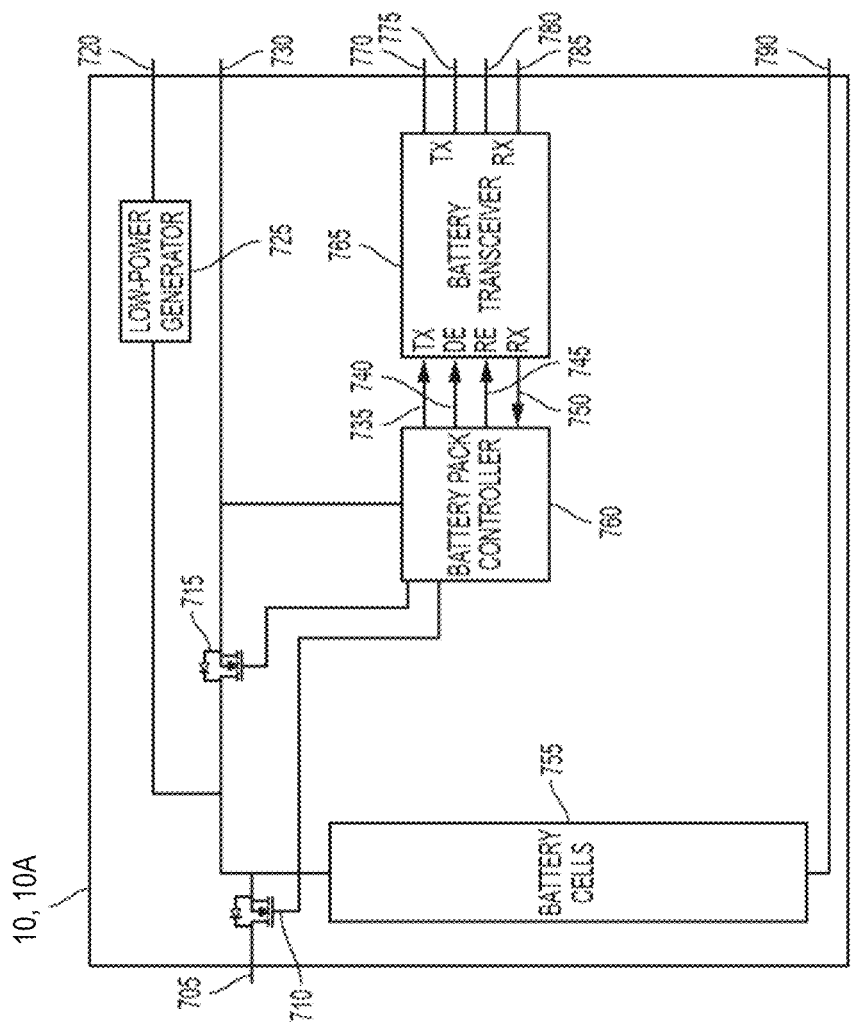
FIG. 7 is a simplified block diagram of the battery pack.

FIG. 7 is a simplified block diagram of the battery pack 10, 10A. The battery pack 10, 10A includes battery cells 755, a battery controller 760, a low-power generator 725, and a battery transceiver 765. The battery controller 760 may be implemented in ways similar to the first controller 245 and the second controller 240.

In some embodiments, a battery discharging switch 715 is connected between the battery cells 755 and the positive battery terminal 730. The battery controller 760 is operable to control (e.g., open and close) the discharging switch 715 to control discharge of the battery cells 755. In some embodiments, a charging switch 710 may also be connected between the battery cells 755 and the charger terminal 705. The battery controller 760 is operable to control (e.g., open and close) the charging switch 710 to control charging of the battery cells 755. In some embodiments, when the discharging switch 715 and the charging switch 710 are implemented using MOSFETs, two MOSFETS, in series, may be used as the discharging switch 715 and the charging switch 710. This allows the discharging switch 715 and the charging switch 710 to prevent any current flow in either direction when the discharging switch 715 and the charging switch 710 are open.

The discharging switch 715 and the charging switch 710 may be implemented using bi-polar junction transistors, field-effect transistors (FETs), etc. In some embodiments, the discharging switch and the charging switch 710 may be connected on the ground-side of the battery cells 755 between the battery cells 755 and the ground terminal 790. In some embodiments, the ground terminal 790 may be split into a charging path ground terminal and a discharging path ground terminal.

The low-power generator 725 is connected between the battery cells 755 and the low-power terminal 720. The low-power generator 725 provides a low-power voltage supply at the low-power terminal 720 to the power tool device 200. In some embodiments, the battery controller 760 may provide control signals to the low-power generator 725 to control the operation of the low-power generator 725.

In the illustrated example, the battery transceiver 765 is implemented as a differential communication transceiver (e.g., Texas Instruments SN65HVD7 Full Duplex RS-485 Transceiver). The battery transceiver 765 receives a transmission signal 735 from the battery controller 760 and sends a receiver signal 750 to the battery controller 760.

The battery transceiver 765 is also connected to the communication terminals (770, 775, 780, and 785). When the battery pack 10 transmits a communication signal to the power tool device 200 or charger, the battery controller 760 sends a transmission enable signal 740 in addition to a transmission enable signal 740 to the battery transceiver 765. When the battery transceiver 765 receives the transmission enable signal 740, the battery transceiver 765 converts the transmission signal 735 to complementary transmission signals at the positive transmission terminal 770 and the negative transmission terminal 775. When the battery transceiver 765 receives a receiver enable signal 745 from the battery controller 760, the battery transceiver 765 receives complementary signals from the positive receiver terminal 780 and the negative receiver terminal signal 750 to the battery controller 760. The power tool device 200 may similarly include a power tool device transceiver that interacts with the first controller 245 in a similar way to provide communications with the battery controller 760.

In other embodiments, rather than the battery transceiver 765, the battery pack 10 may include separate transmitting and receiving components, for example, a transmitter and a receiver.

The battery controller 760 communicates with the first controller 245 through the battery terminals via the communication link 265 (e.g., an RS-485 link). The communication link 265 between the battery controller 760 and the first controller 245 may be used for battery pack 10, 10A and power tool device 200 authentication or to exchange other information (e.g., discharge capabilities of the battery pack 10, 10A). The first controller 245 and the battery controller 760 may be configured such that the first controller 245 and the battery controller 760 exchange communications at a certain time interval. The time interval may be, for example, between 3 ms to 15 ms.

The battery controller 760 and the first controller 245 exchange information as "grouped reads." "Grouped reads" include exchanging several bits of data containing information regarding different groups of measurements, states, etc. of the battery pack 10 and/or the power tool device 200. The controllers 245, 240 may exchange different grouped reads containing varying types of data based on requirements of the system (e.g., of the electrical device or power tool device 200).

For example, in a first group, the battery controller 760 may send simple communications, a thermistor reading, and a general condition register to the first controller 245. Simple communications include, for example, battery pack current, battery pack state, an "imminent shutdown" bit, and battery pack conditions. The "imminent shutdown" bit provides a true or false signal regarding whether the battery pack 10 is a near failure state. The general conditions register includes, for example, errors and warnings concerning temperature, state of charge, etc.

In a second group, the battery controller 760 may send simple communications, general conditions register, a battery pack voltage, a battery pack voltage post discharge switch 255, and daughterboard information. The daughterboard information may include information concerning communication states, communication retries, and board interface retires between the controllers 245, 240 or between the controller 245, 240, and any attached daughterboard.

In a third group, the battery controller 760 may send simple communications, a general conditions register, and a dynamic load request. The dynamic load request includes, for example, a target current, diagnostics information, and voltage and current information. The target current is the amount of current the battery pack 10 can currently support. The voltage and current information may include voltage and current in a different format than that provided in the simple communication. Additional performance indicators can also be exchanged between the controllers 245, 240.

Figure 8:
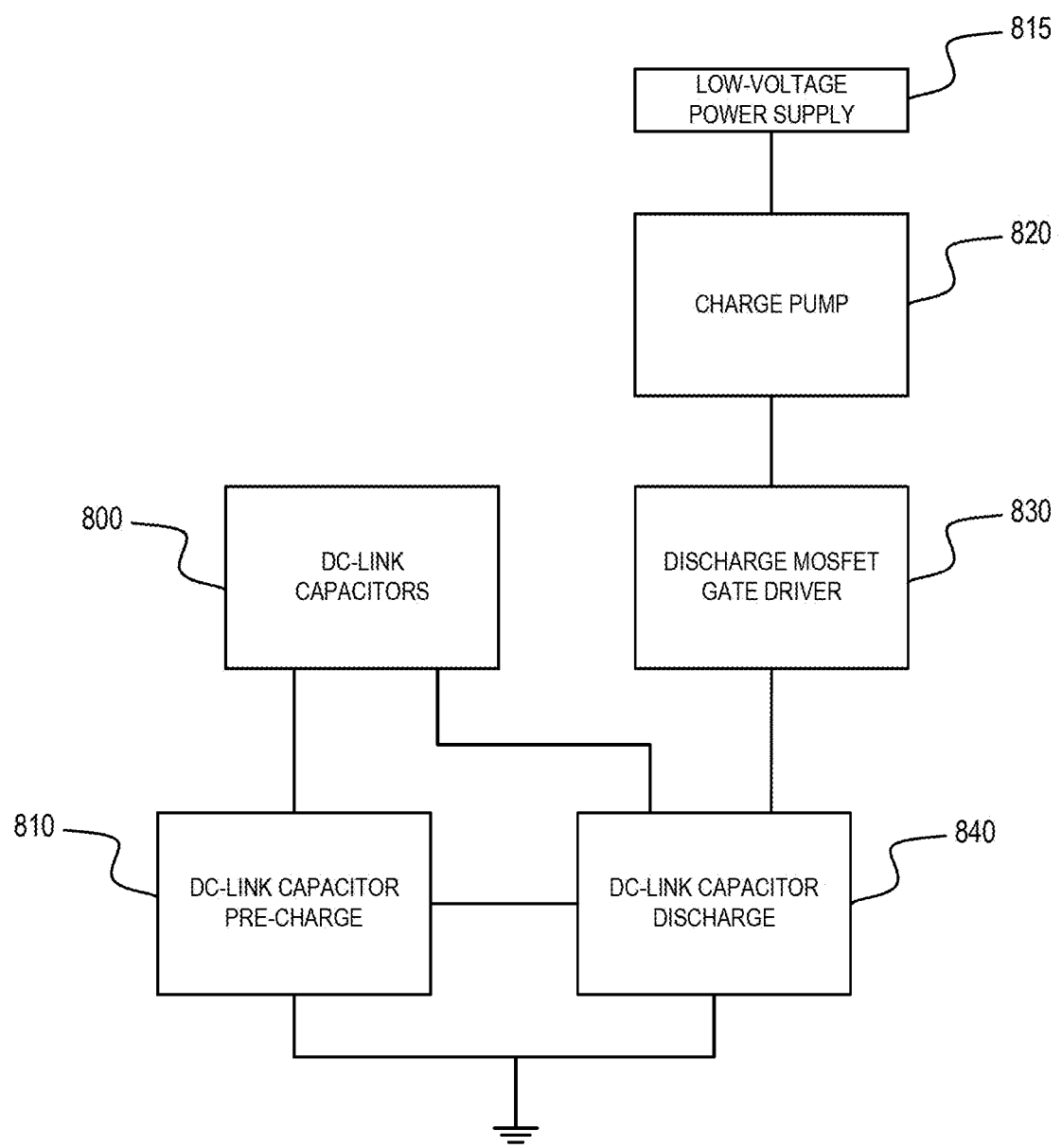
FIG. 8 illustrates a high-level diagram of a capacitance control system.

FIG. 8 illustrates a high-level diagram of a capacitance control system. This system includes DC-link capacitors 800, a pre-charge circuit 810, a low-voltage power supply 815, a charge pump circuit 820, a discharge gate driver 830, and a DC-link capacitor discharge circuit 840. The charge pump circuit 820 is electrically connected to the low-voltage power supply 815 and the discharge gate driver 830. The DC-link capacitors 800 are electrically connected to the pre-charge circuit 810 and the DC-link capacitor discharge circuit 840. The discharge gate driver 830 is electrically connected to the charge pump circuit 820 and the DC-link capacitor discharge circuit 840. The DC-link capacitor discharge circuit 840 is electrically connected to the pre-charge circuit 810, the DC-link capacitors 800, and the discharge gate driver 830. The pre-charge circuit 810 is electrically connected to the DC-link capacitors 800 and the DC-link capacitor discharge circuit 840.

The capacitance control system includes at least one switch (e.g., a transistor, a FET, etc.), at least one resistor or a constant current controller, and at least one diode. These electrical components are used to allow charging of bulk capacitors of the DC-link capacitors 800. The capacitance control system is turned ON once the power tool device 200 powers on. The current in the circuit is limited by an equivalent resistance of the pre-charge circuit 810. Through limiting the pre-charge current with the pre-charge circuit 810, electrical components, such as other switches (e.g., FETs), can be reduced in size. For example, through the implementation of the pre-charge circuit 810, the electrical components will handle smaller amounts of surge current when the power tool device 200 turns on.

Figure 9:
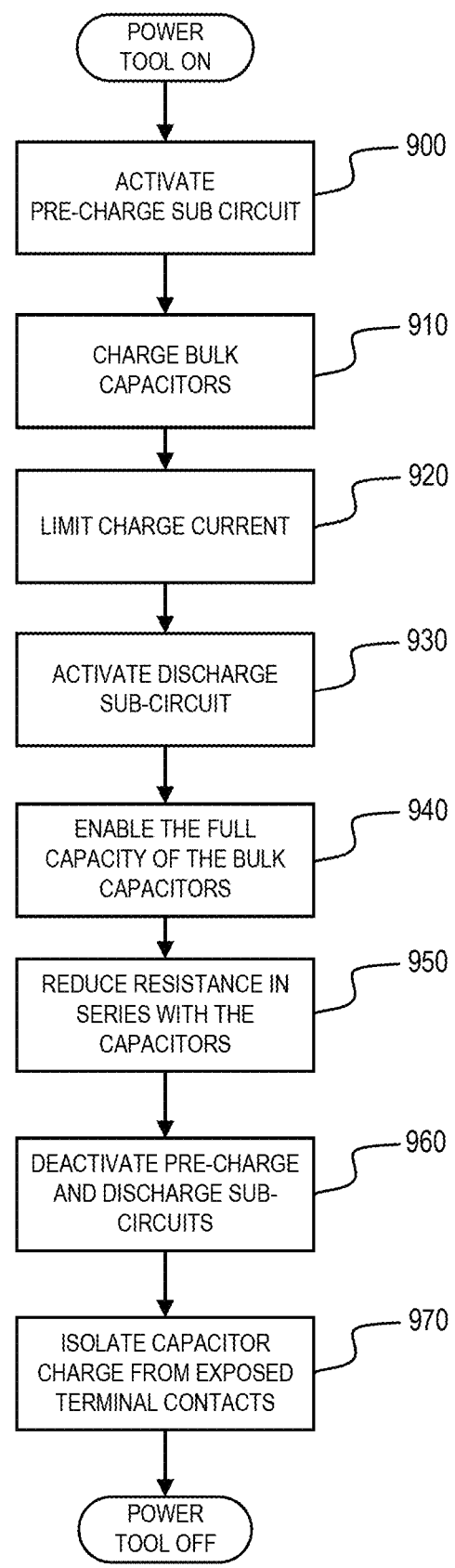
FIG. 9 illustrates an electrical process of the capacitance control system of FIG. 8.
Figure 10:
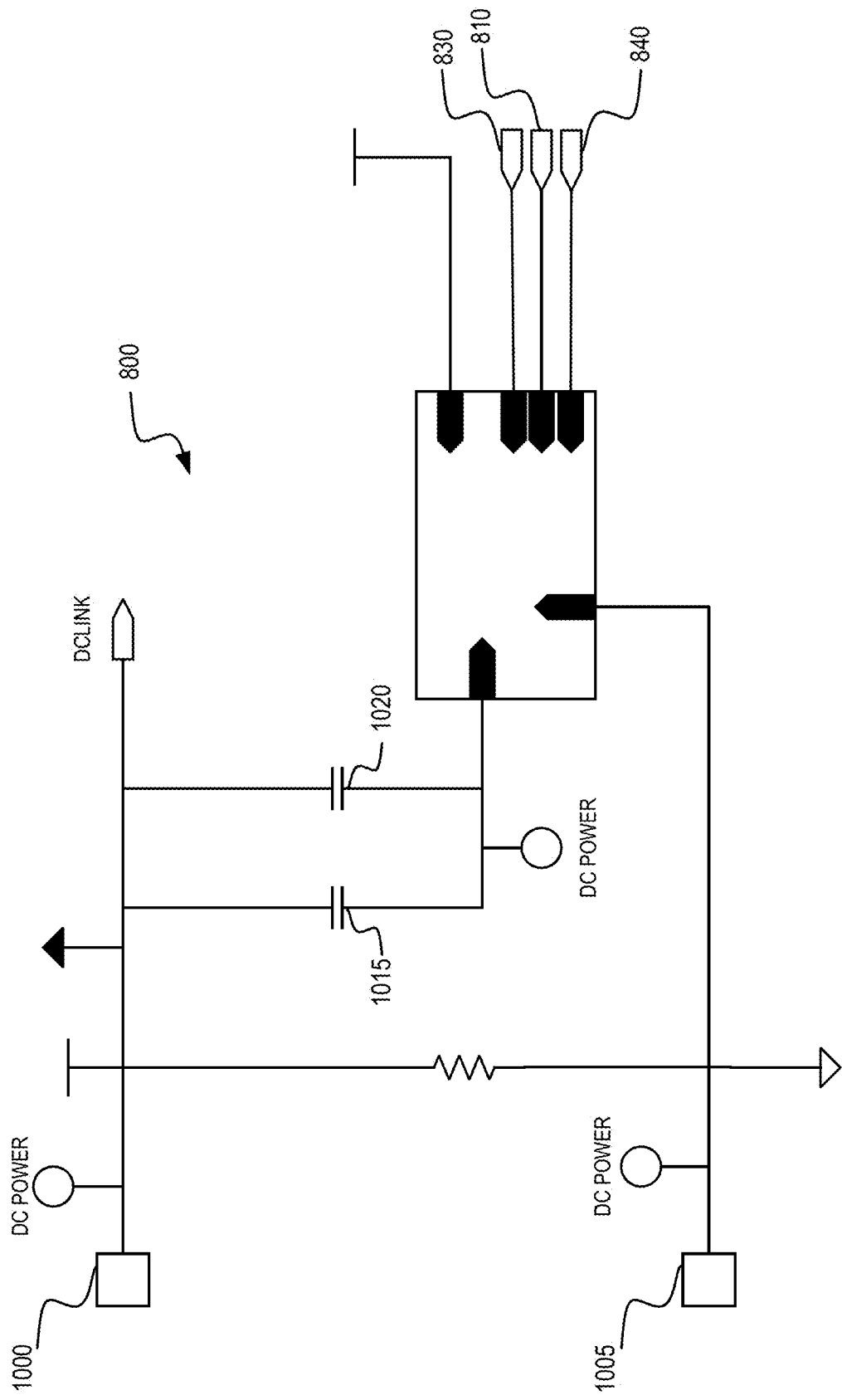
FIG. 10 illustrates DC-link capacitors.

FIG. 9 illustrates a diagram outlining the operational process of the capacitance control system. After the power tool device turns on, the pre-charge circuit 810 is activated (STEP 900). The bulk capacitors (as shown in FIG. 10) begin to charge (STEP 910). The current charging the bulk capacitors is limited through an equivalent resistance (e.g., hundreds of Ohms) or a constant current driver of the pre-charge circuit 810 (STEP 920). The DC-link capacitor discharge circuit 840 (STEP 930) enables the full capacity of the bulk capacitors in the DC-link capacitors 800 (STEP 940). Specifically, after the bulk capacitors of the DC-link capacitors 800 are charged, but before the power tool device 200 fully turns ON, switches in the DC-link capacitor discharge circuit 840 are turned ON (STEP 950) to reduce the resistance in series with the bulk capacitors of the DC-link capacitors 800 (e.g., to less than five milli-Ohms, less than three milli-Ohms, less than two milli-Ohms, etc.). The reduced series resistance with the bulk capacitors improves the performance of the bulk capacitors.

When the power tool device 200 is turned OFF, both the pre-charge circuit 810 and the DC-link capacitor discharge circuit 840 can be turned OFF (STEP 960). By turning off both circuits, the bulk capacitors in the DC-link capacitors 800 are disconnected or isolated from the battery pack terminals of the power tool device 200 (STEP 970). The bulk capacitors will remain at their charged level, while smaller capacitances are discharged between the battery pack terminals of the power tool device 200. As a result, the voltage present at the battery pack terminals bleeds below a threshold value (e.g., 30 volts) within a threshold time period (e.g., one second). In some embodiments, the terminal voltage is reduced below the threshold value in less than 150 milli-seconds.

FIG. 10 illustrates the DC-link capacitors 800. The DC-link capacitors 800 are connected to the power tool device 200's external power terminals 1000 (B+) and 1005 (B−) by a DC voltage bus (e.g., a DC-link). The external power terminals 1000, 1005 are configured to provide power to the power tool device 200. When the power tool device 200 has been turned ON, power from the external power terminals 1000, 1005 is used to charge bulk capacitors 1015, 1020 of the DC-link capacitors 800.

Figure 11:
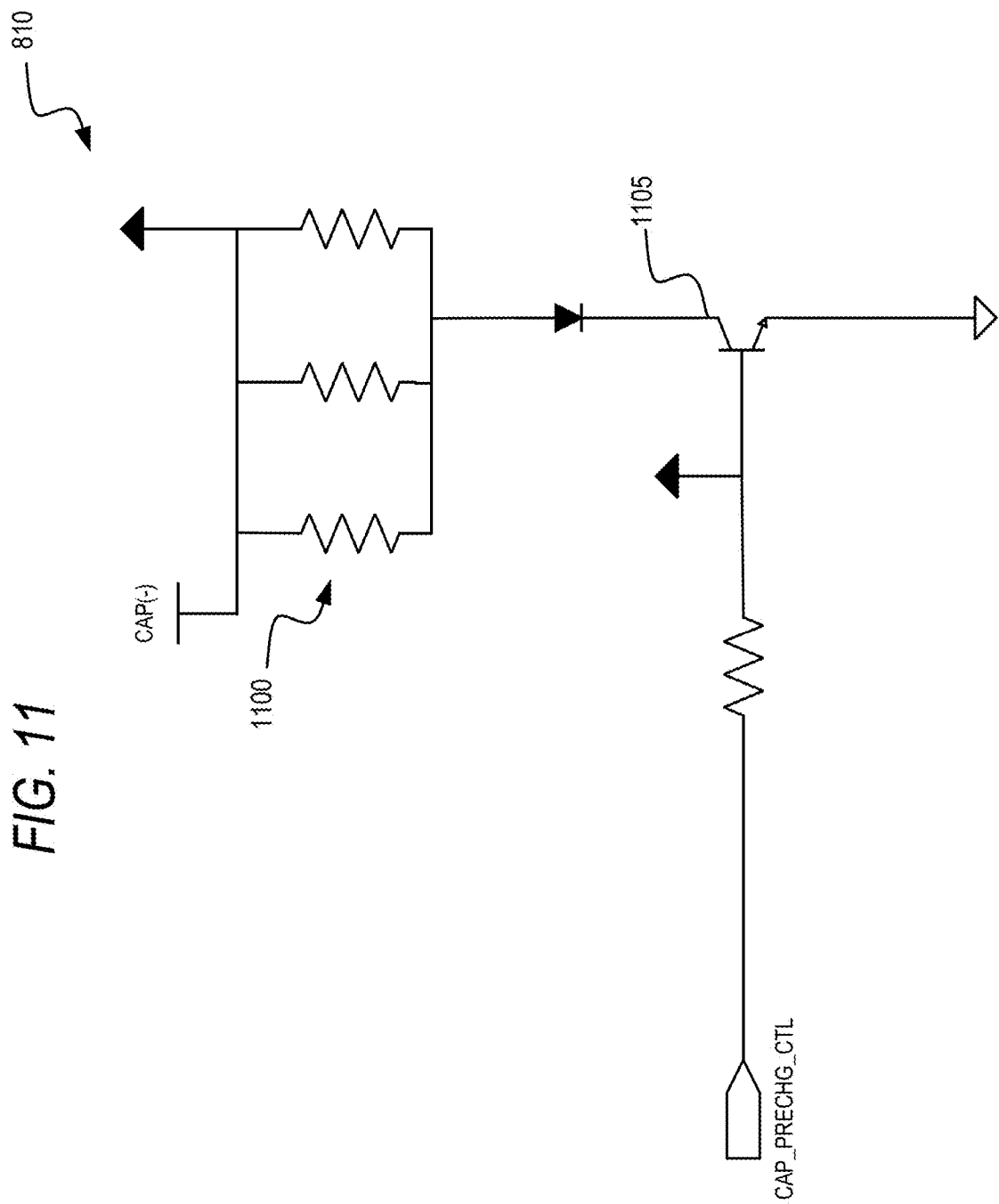
FIG. 11 illustrates a pre-charge circuit.

FIG. 11 illustrates the pre-charge circuit 810. The bulk capacitors 1015, 1020 of the DC-link capacitors 800 (as shown in FIG. 10) are charged by the pre-charge circuit 810. Specifically, a switch 1105 is turned ON by the first controller 245 or second controller 240 to create a conductive path for charging the bulk capacitors 1015, 1020. The resistors 1100, shown in parallel with each other, provide the equivalent resistance that limits the charging of the bulk capacitors 1015, 1020. Because the current is limited, the peak in-rush current (from battery pack 10, 10A) experienced by the power tool device 200 is reduced when the power tool device 200 is turned on. In some embodiments, a constant current controller is used to regulate charging current and a series resistance is not included in the pre-charge circuit 810.

Figure 12:
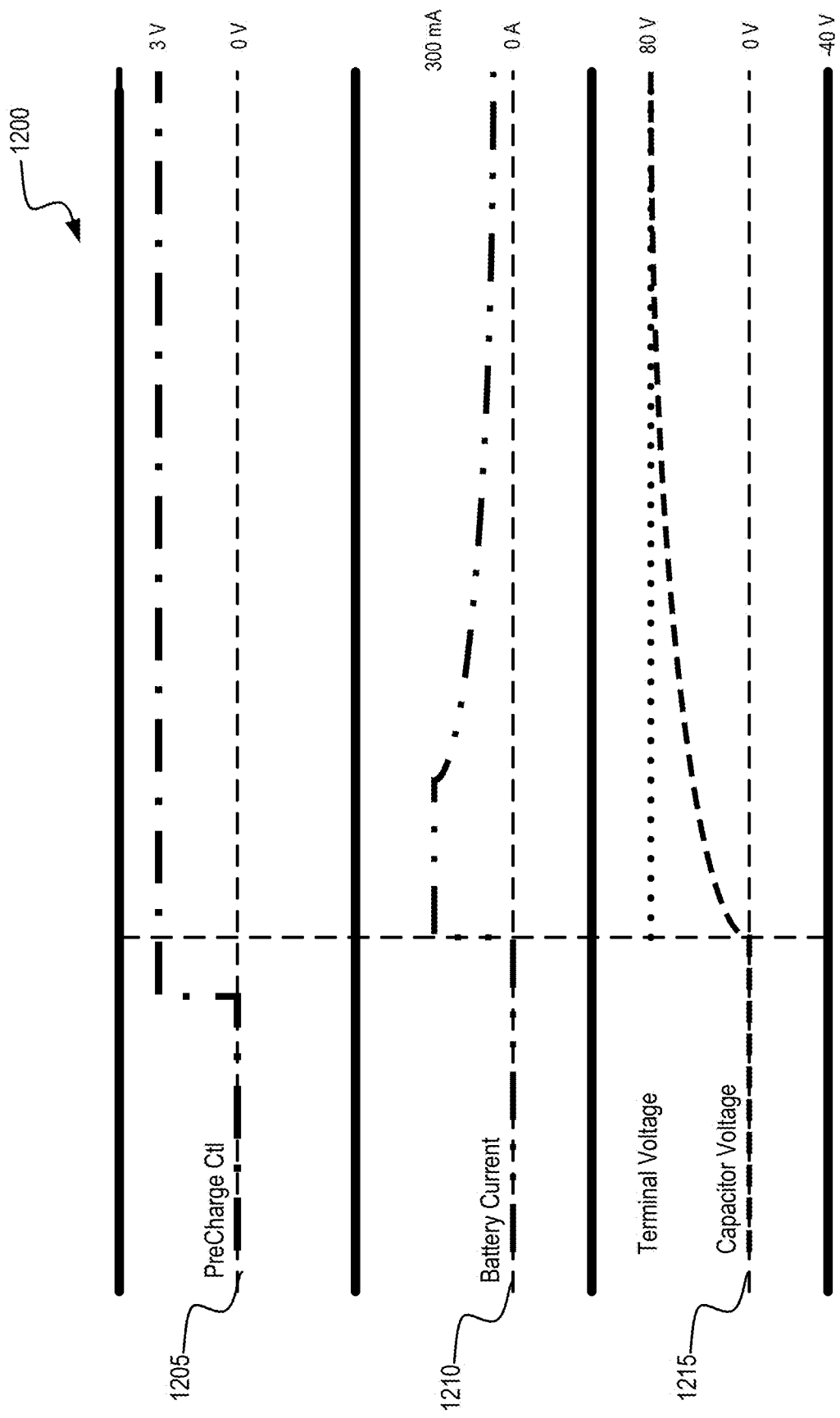
FIG. 12 illustrates a simulation of the pre-charge circuit.

The effect of the pre-charge circuit 810 is shown in FIG. 12. FIG. 12 illustrates the operation of the pre-charge circuit 810 through showing the characteristics 1200 of the operation of the pre-charge circuit 810. A precharge control signal 1205 from the first controller 245 or second controller 240 is turned ON to activate the pre-charge circuit 810 (i.e., by turning ON the switch 1105). After the pre-charge circuit 810 is activated, the battery current 1210 provided to the bulk capacitors 1015, 1020 is limited to approximately 300 milli-Amps. As the bulk capacitors' voltage 1215 rises, the battery current 1210 gradually decreases as the charge of the bulk capacitors 1015, 1020 approaches the battery pack terminal voltage (e.g., 80 V).

Figure 13:
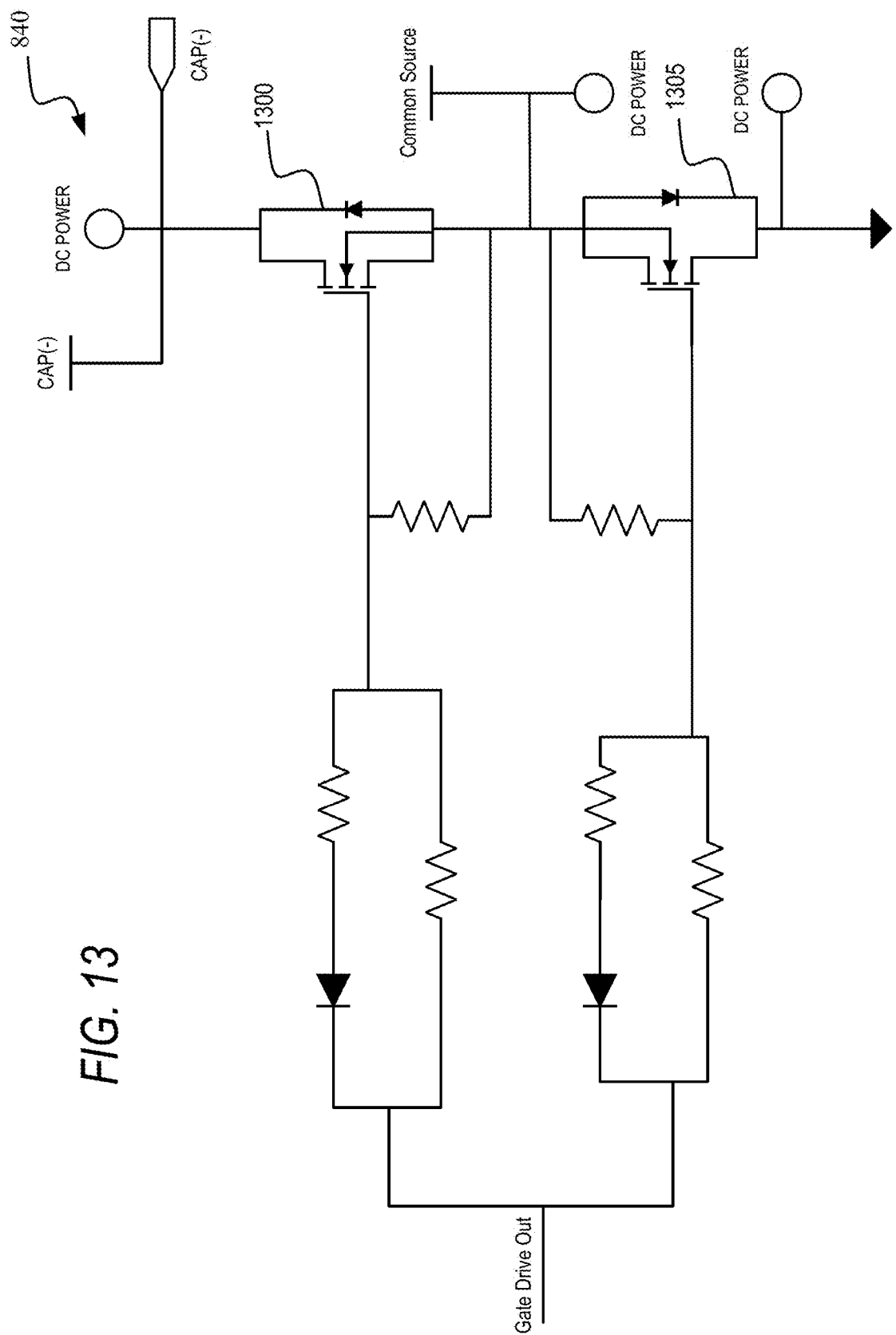
FIG. 13 illustrates a DC-link capacitor discharge circuit.

FIG. 13 illustrates the DC-link capacitor discharge circuit 840. The DC-link capacitor discharge circuit 840 includes switches 1300, 1305 (e.g., FETs). The DC-link capacitor discharge circuit 840 is electrically connected in parallel to the pre-charge circuit 810 and in series with the DC-link capacitors 800. The DC-link capacitor discharge circuit 840 is controlled by the discharge gate driver 830. After the bulk capacitors 1015, 1020 have been fully charged, the switch 1105 of the pre-charge circuit 810 can be turned OFF, and the switches 1300, 1305 are turned ON. By turning the switch 1105 off and the switches 1300, 1305 ON, the resistance in series with the bulk capacitors 1015, 1020 is significantly reduced (e.g., down to a couple milli-Ohms). Such control enables the full capability of the bulk capacitors 1015, 1020. Additionally, because the charging current of the bulk capacitors is limited by the pre-charge circuit 810, the switches 1300, 1305 can be smaller switches that do not need to be rated to handle potentially hundreds of Amps of in-rush current when turned ON.

Figure 14:
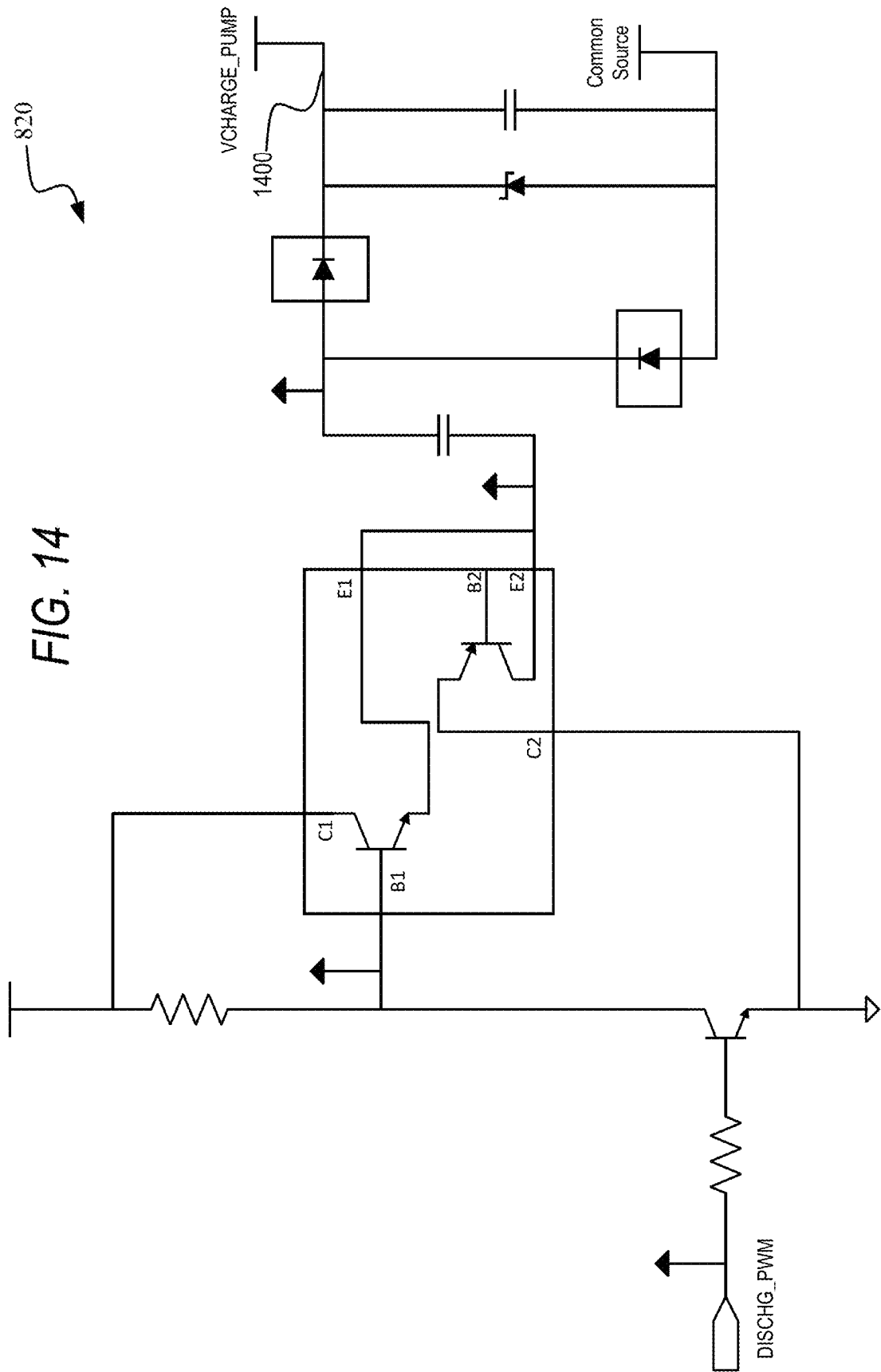
FIG. 14 illustrates a charge pump circuit.

FIG. 14 illustrates the charge pump circuit 820. The charge pump circuit 820 is configured as a DC-to-DC converter. The charge pump circuit 820 receives an input from the first controller 245 or second controller 240 and power from the low-voltage power supply 815. The charge pump circuit 820 provides an output charge pump signal 1400 to the discharge gate driver 830 for ultimately driving the switches 1300, 1305.

Figure 15:
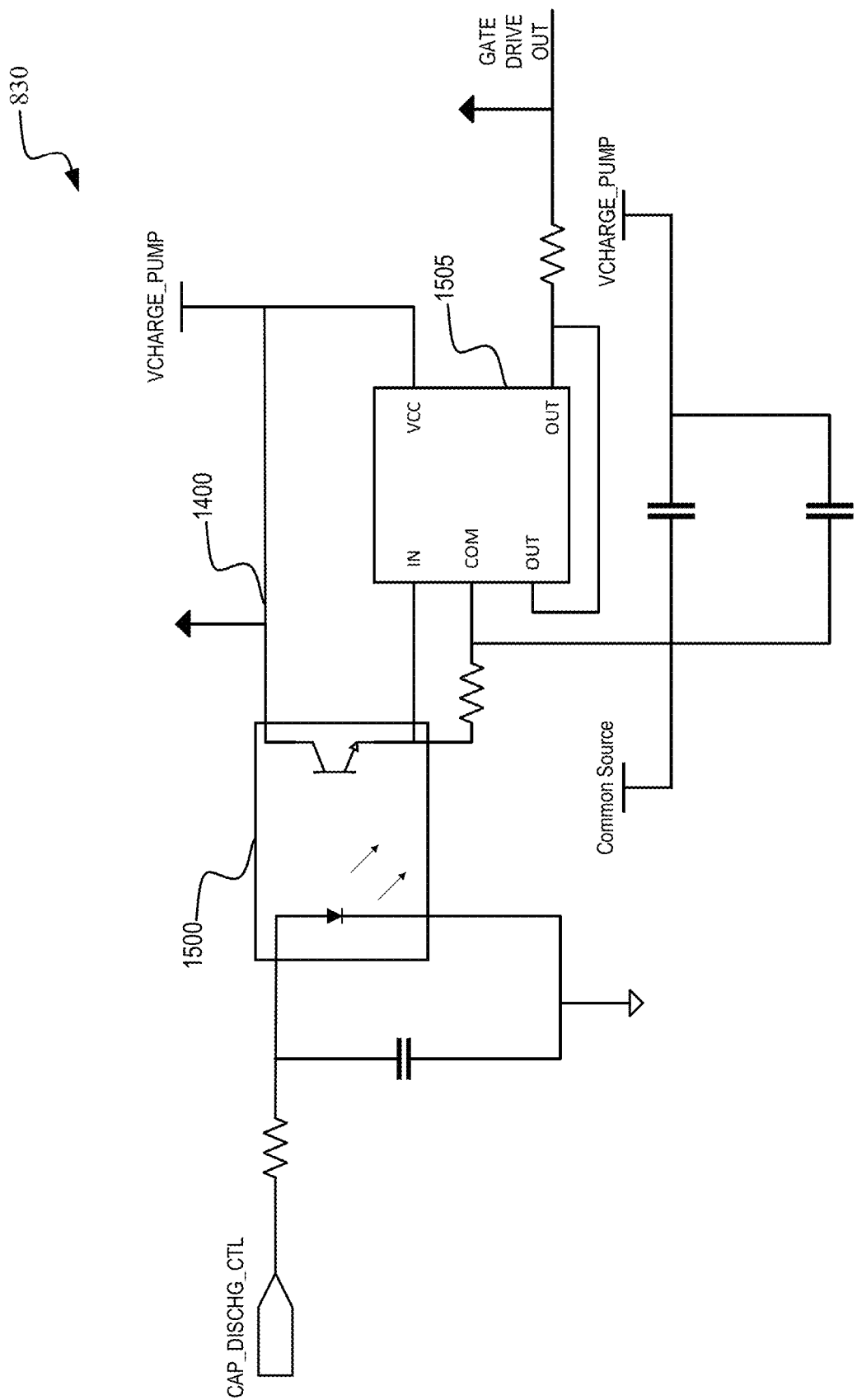
FIG. 15 illustrates a discharge MOSFET gate driver.

FIG. 15 illustrates the discharge gate driver 830. The discharge gate driver 830 is electrically connected to the charge pump circuit 820 to receive the output charge pump signal 1400, the first controller 245 or second controller 240 to receive a capacitor discharge signal, and the DC-link capacitor discharge circuit 840 for controlling the conductive state of the switches 1300, 1305. The discharge gate driver 830 provides a gate voltage to the switches 1300, 1305 which controls the conductive state of the switches 1300, 1305. The capacitor discharge signal can be used to control an opto-coupler 1500 that selectively connects the output charge pump signal 1400 to a gate driver integrated circuit 1505. The output of the gate driver integrated circuit 1505 is input to the DC-link capacitor discharge circuit 840 for controlling the switches 1300, 1305.

Thus, embodiments described herein provide, among other things, systems and method for controlling bulk capacitance charge in a power tool device. Various features and advantages are set forth in the following claims.

What is claimed is:

1. A power tool device comprising:
a housing;
a positive battery pack terminal and a negative battery pack terminal;
at least one bulk capacitor;
a pre-charge circuit including:
at least one resistance connected in series with the at least one bulk capacitor, the at least one bulk capacitor electrically connected between the positive battery pack terminal and the at least one resistance, and
a pre-charge switch connected in series with the at least one resistance, the pre-charge switch configured to selectively provide a conductive path to charge the at least one bulk capacitor; and
a discharge circuit including:
a first switch and a second switch connected in series with the at least one bulk capacitor, the first switch and the second switch configured to be turned on after the at least one bulk capacitor is charged to a DC bus voltage.

2. The power tool device of claim 1, further comprising a charge pump circuit.

3. The power tool device of claim 1, further comprising a discharge gate driver.

4. The power tool device of claim 1, wherein the pre-charge circuit is turned on when the power tool device is powered on.

5. The power tool device of claim 1, wherein the pre-charge switch, the first switch, and the second switch are turned off when the power tool device is powered off.

6. The power tool device of claim 1, wherein the pre-charge circuit is connected in parallel with the discharge circuit, the at least one bulk capacitor electrically connected between the positive battery pack terminal and the discharge circuit.

7. A method for controlling a power tool device, the power tool device including a positive battery pack terminal and a negative battery pack terminal, the method comprising:
activating a pre-charge circuit, wherein activating the pre-charge circuit includes:
charging at least one bulk capacitor, and
limiting a charge current to the at least one bulk capacitor using a first resistance connected in series with the at least one bulk capacitor, the at least one bulk capacitor electrically connected between the positive battery pack terminal and the at least one resistance;
activating a discharge circuit, wherein activating the discharge circuit includes:
enabling a full charge capacity of the at least one bulk capacitor,
reducing a resistance in series with the at least one bulk capacitor; and
deactivating the pre-charge circuit and the discharge circuit.

8. The method of claim 7, further comprising:
receiving, at a charge pump circuit, an input from a controller for controlling a discharge gate driver.

9. The method of claim 8, further comprising:
providing, via the charge pump circuit, an output charge pump signal to the discharge gate driver to drive a plurality of switches.

10. The method of claim 9, wherein the charge pump circuit is configured as a DC-to-DC converter.

11. The method of claim 7, wherein the at least one bulk capacitor includes a plurality of bulk capacitors.

12. The method of claim 7, further comprising:
activating the pre-charge circuit when the power tool device is turned on.

13. The method of claim 7, further comprising:
deactivating a pre-charge switch, a first switch of the discharge circuit, and a second switch of the discharge circuit when the power tool is turned off.

14. The method of claim 7, further comprising:
connecting the pre-charge circuit in parallel with the discharge circuit,
wherein the at least one bulk capacitor is electrically connected between the positive battery pack terminal and the discharge circuit.

15. The method of claim 7, further comprising:
isolating the at least one bulk capacitor from exposed terminal contacts.

16. A power tool comprising:
a housing;
a positive battery pack terminal and a negative battery pack terminal;
a plurality of bulk capacitors;
a pre-charge circuit including:
at least one resistance connected in series with the plurality of bulk capacitors, the plurality of bulk capacitors electrically connected between the positive battery pack terminal and the at least one resistance, and a pre-charge switch connected in series with the at least one resistance, the pre-charge switch configured to selectively provide a conductive path to charge the plurality of bulk capacitors; and a discharge circuit including:
a first switch and a second switch connected in series with the plurality of bulk capacitors, the first switch and the second switch configured to be turned on after the plurality of bulk capacitors are charged to a DC bus voltage.

17. The power tool of claim 16, further comprising a charge pump circuit.

18. The power tool of claim 17, wherein the charge pump circuit is a DC-to-DC converter.

19. The power tool of claim 16, wherein the pre-charge circuit is turned on when the power tool device is powered on.

20. The power tool of claim 16, wherein the pre-charge switch, the first switch, and the second switch are turned off when the power tool device is powered off.

* * * * *